United States Patent [19]

Beck

[11] Patent Number: 4,542,775
[45] Date of Patent: Sep. 24, 1985

[54] SLURRY CONCENTRATION AND DILUTION APPARATUS

[75] Inventor: Jeffrey L. Beck, Ponca City, Okla.

[73] Assignee: Conoco Inc., Ponca City, Okla.

[21] Appl. No.: 551,544

[22] Filed: Nov. 14, 1983

Related U.S. Application Data

[63] Continuation-in-part of Ser. No. 264,917, May 18, 1981, Pat. No. 4,444,229.

[51] Int. Cl.³ .............................................. B65B 31/00
[52] U.S. Cl. ........................................ 141/65; 141/67; 37/58; 55/205; 137/812; 73/53; 210/512.1; 406/96; 417/171
[58] Field of Search .................. 417/54, 65, 171, 194; 141/1–12, 37–70, 94–96, 192–198; 406/93, 96, 109, 152, 153; 37/58, 195; 210/787, 788, 304, 512.1, 512.2; 55/205; 73/53, 61 R, 61.1 R; 137/812

[56] References Cited

U.S. PATENT DOCUMENTS 3,548,637  12/1970  Wicks ...................................... 73/53
4,412,451  11/1983  Uusitalo et al. .................... 73/61 R Primary Examiner—Houston S. Bell, Jr.
Attorney, Agent, or Firm—William J. Miller

[57] ABSTRACT

Apparatus for not only removing fluids from a slurry system but also for injecting fluid into the slurry system so that the concentration can be positively maintained. The apparatus provides for a uniform dilution of slurry so that the fluids will not segregate the slurry causing portions to have low concentration when fluids are added or portions which have high concentration when fluids are removed.

3 Claims, 1 Drawing Figure

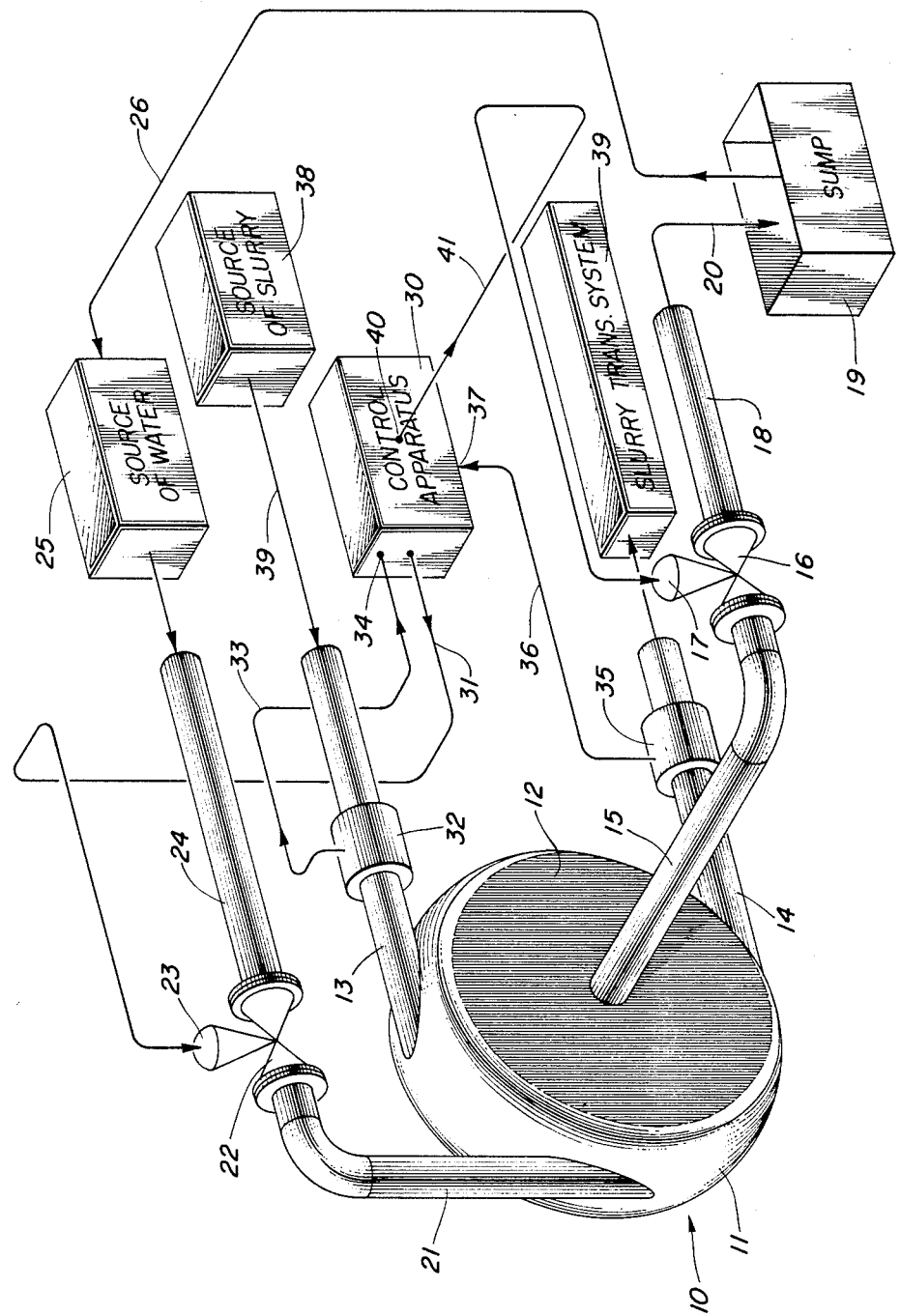

SLURRY CONCENTRATION AND DILUTION APPARATUS

This application is a continuation-in-part of application Ser. No. 264,917 filed May 18, 1981, entitled "Slurry Concentration Apparatus" by Jeffrey L. Beck now U.S. Pat. No. 4,444,229 issued Apr. 24, 1984.

RELATED APPLICATIONS

Application Ser. No. 140,516 filed Apr. 15, 1980, entitled "Pressure Dissipation Device" by Jeffrey L. Beck and William T. Sweeney now U.S. Pat. No. 4,333,499 issued June 8, 1982; application Ser. No. 218,857 filed Dec. 22, 1980, entitled "Vortex Injection Method and Apparatus" by Jeffrey L. Beck; and application Ser. No. 231,637 filed Feb. 5, 1981, entitled "Dredging Apparatus" by Jeffrey L. Beck are related to this application.

BACKGROUND OF THE INVENTION

In application Ser. No. 140,516 an apparatus is disclosed for dissipating the pressure of a confined fluid having a housing with a side wall in a substantially circular crosssectional configuration with a top and bottom. Inlet means is formed into the side wall so that the axis of the inlet is tangent to a diameter of the side wall. An outlet port through the bottom and an opening port through the top are also formed. High pressure fluids entering the inlet form a vortex around the side wall and between the top and the bottom and pass out the outlet under low pressure. Air is introduced through the openings in the top to prevent cavitation within the housing. A device may be coupled to the outlet to reduce the velocity of the fluids leaving the outlet.

In application Ser. No. 218,857 a method and apparatus are disclosed for injecting a low pressure slurry into a high pressure stream to form a high pressure slurry by injecting a high pressure fluid into a chamber. A portion of the high pressure fluid is removed at a central location in the chamber, to form a fluid low pressure vortex. The low pressure slurry is injected into the low pressure vortex where it mixes with the high pressure fluids. The slurry, at a high pressure, is removed from a high pressure outlet.

The parent application describes a system for removing water from a slurry in order to increase the concentration of the slurry. The system operates by injecting the high pressure fluid into and out of a substantially circular chamber while letting part of the fluid exit under low pressure from an outlet mounted with its axis parallel to the axis of the circular chamber. The amount of fluid that is permitted to exit is controlled by a valve mounted in series with the low pressure outlet. The particular valve used provides a uniform reduction of diameter upon closure. In case a vacuum is developed inside the chamber, an apparatus comprising a check valve, permits air to enter the chamber, thereby equalizing the air between the outside and inside of the chamber wall, thereby preventing cavitation. Apparatus is also provided to measure the concentration of the slurry at the high pressure outlet and communicate that information to the control valve so that the control valve will tend to maintain the slurry concentration at a predetermined or preset level.

BRIEF DESCRIPTION OF THE INVENTION

This invention provides a means for not only removing fluids from a slurry system in order to increase the concentration but also provides a means for injecting fluid into a slurry so that the concentration can be diluted. The method provides for a uniform dilution of slurry so that the fluids will not segregate the slurry causing wide variations in slurry concentrations. It also provides for a more mechanically reliable means for controlling concentrations than that provided in the parent application.

BRIEF DESCRIPTION OF THE DRAWING

The drawing shows a perspective view of a slurry concentration and dilution apparatus including the control apparatus.

DETAILED DESCRIPTION OF THE INVENTION

The apparatus basically includes a vortex chamber 10 which is comprised of a side wall 11 and end wall 12 with a first tangential inlet pipe 13 and a second tangential outlet pipe 14. A second end wall is not illustrated but the side wall 11 and the end walls form a closed chamber with tangential pipes 13 and 14 porting into the chamber. An axial outlet pipe 15 is mounted to end wall 12 and may include a valve 16 with a control mechanism 17. Valve 16 is coupled to a pipe 18 and to a sump 19 as illustrated by arrow 20. A third tangential pipe 21 is mounted in side wall 11 and is coupled to a valve 22 which also contains a valve control mechanism 23. Valve 22 is connected to a water inlet pipe or dilution outlet pipe 24 which is coupled to a source of fluid 25 such as water. The source of water may be coupled through a pipe 26 to sump 19. It is obvious, of course, that various pumps and pumping apparatus are not illustrated for the purpose of simplifying the invention; however, pumps will be connected or used wherever necessary to move the fluids into or out of the vortex chamber.

In order to control the operation of the various inputs and outputs and the dilution or concentration capabilities of the apparatus, a control apparatus 30 has an output wire 31 coupled to valve control mechanism 23. A flowmeter or density meter 32 has its output coupled to a wire 33 to the input 34 of control apparatus 30. A second densitometer apparatus 35 is attached to pipe 14. The output from densitometer 35 is coupled through a wire 36 to the input 37 of control apparatus 30. A second output 40 is coupled from control apparatus 30 through wire 41 to valve control mechanism 17 of valve 16. A source of slurry 38 is coupled through means 39 to pipe 13.

OPERATION

The apparatus above-described operates in the following manner.

A source of slurry 38 conveys its material through means 39 to pipe 13 which is ported into vortex chamber 10. The heavy material, due to centrifugal force, is maintained around the outside next to side wall 11 of chamber 10 and is outputted through pipe 14 to a slurry transportation system illustrated by box 39. As the slurry is being passed through pipe 13, its concentration is being measured by densitometer 32 which communicates the measured density through wire 33 to input 34 of control apparatus 30. At the same time the density in the outlet pipe 14 is being measured by densitometer 35 which is outputting its measured density through a wire 36 to input 37 of control apparatus 30. If the density is too high, however, fluid must be added before the slurry can be moved to the next or subsequent operation, since slurry of too heavy a concentration can cause problems such as plugging of the pipe or inefficient pumping of the slurry. If the slurry passing through pipe 13 is being measured as having too high a concentration by densitometer 32, then the information being sent through wire 33 to the inlet 34 of control apparatus 30 results in a signal through wire 31 to valve control mechanism 23 causing valve 22 to open. When the valve opens, water is transferred from the sump 19 through pipe 26 to the source of water 25 which may be a subsequent sump or a water storage tank or it may be any necessary transmission apparatus such as pumps or the like. The water then passes from the source of water 25 into pipe 24 through valve 22 and into pipe 21 which is tangentially coupled to vortex apparatus 10. Water is then injected through the chamber with the material being inputted through pipe 13. The centrifugal force will cause the water to mix very rapidly with the material inside the chamber resulting in a very uniform dilution of the material inside chamber 10. The diluted material is then outputted through pipe 14 to the slurry transportation system 39.

Densitometer 35 is also measuring the new concentration of the material inside pipe 14 and communicating this information through wire 36 to input 37 of control apparatus 30. Water will continue to be added through pipe 21 from valve 22 as long as the slurry is indicated as having too high a concentration. If the slurry concentration should get too low due to a sudden change in the concentration coming through the source of slurry 38, then the control apparatus will receive this information from densitometer 32 and subsequently from densitometer 35, such information being communicated through wires 33 and 36, respectively. This drop in concentration will cause the control apparatus to reduce or discontinue sending the signal through wire 31 to valve control mechanism 23. Such a reduction or discontinuance in the signal will cause valve 22 to close by an amount indicated by the change in the signal along wire 31. Such a change will then reduce or eliminate the source of water being passed through the valve and into tangential inlet 21. At the same time a signal may be transmitted through wire 41 to valve control mechanism 17 causing valve 16 to open. When valve 16 opens, water along the vortex of vortex apparatus 10 will begin to pass out axial outlet 15 through valve 16, pipe 18 and in the direction of arrow 20 to sump 19. Since the centrifugal force within the vortex chamber will cause the majority of the particles to be along the periphery, most of the fluid exiting outlet 15 will be water or very fine material. The density during this operation is continually monitored by densitometer 35 which is communicating the change in density through wire 36 to input 37 of control apparatus 30. Thus the apparatus disclosed has the ability to maintain very precise control on the density of a slurry passing through the vortex chamber from inlet 13 to outlet 14. If the slurry concentration begins to increase, then diluent is immediately added through pipe 21 to the material inside the vortex chamber 10. If the slurry concentration begins to decrease, then valve 16 will open causing axial flow of water from the vortex chamber to sump 19. It should be noted that, if water was being added through tangential inlet 21 and the concentration suddenly decreases due to a drastic change in the mix of slurry coming from source of slurry 38, then simultaneously the fluids will cease to be added into tangential inlet 21 and fluid will be removed through axial outlet 15. It should be noted also in the particular configuration that the transient time or hysteresis inherent in the operation of the control apparatus is partially accommodated by the injection of fluids after the change in concentration is noted by densitometer 32.

This system can also be implemented without control valve 16. In such a system axial outlet 15 would communicate directly to pipe 18 and all control would be accomplished by adjusting control valve 22.

CONCLUSIONS

The apparatus has been described for use with a slurry transportation system principally for the transportation of coal particulates, as an example, in a fluid such as water. It is obvious that any material can be transmitted in any fluid in a closed system such as that described in this application; therefore, the material need not be limited to coal nor the fluid to water but any material and any fluid can function satisfactorily in the apparatus described above. The apparatus was described specifically using densitometers; however, it is obvious that other apparatus can be used to measure the concentration of fluids flowing through the pipeline, and the application is not so limited to be strictly to the use of densitometers on the inlet and outlet pipes to the vortex chamber.

It is obvious that changes can be made in the application and still be within the spirit and scope of the invention as disclosed in the specification and appended claims.

What is claimed is:
1. Concentration control apparatus in a slurry system comprising:
   a. a circular side wall with first and second ends attached thereto in a manner to define a chamber;
   b. a first, second and third tangential port means mounted on said side wall and opening into said chamber;
   c. an axial outlet port attached to one of said end walls and opening into said chamber;
   d. a source of fluid;
   e. means coupling said source of fluid to said third tangential port, said coupling means including a controllable valve means;
   f. means coupling said first tangential port to said slurry system;
   g. means coupling said second tangential port to said slurry system;
   h. means coupled to said second tangential means for measuring the density of slurry through said means and generating an output signal in response to said measured density; and
   i. control means accepting said output signal and generating a response signal to said controllable valve means whereby slurry flowing into said chamber through said first tangential port and out of said chamber through said second tangential port can have its density uniformly reduced by injecting fluid into said chamber through said third tangential port.

2. Apparatus as described in claim 1 including a second density measuring means attached to said means coupling said first tangential port to said slurry system, said second density measuring means generating a second output in response to the density of said slurry passing through said coupling means, and means coupling said second generated output to said control means.

3. Apparatus as described in claim 1 or 2 including a sump and wherein said axial port is coupled through a means including a second controlled valve to said sump and wherein said control means has an output coupled to said second control valve, whereby said slurry concentration can be increased by removing liquid from said axial outlet.

* * * * *